Patented Dec. 8, 1936

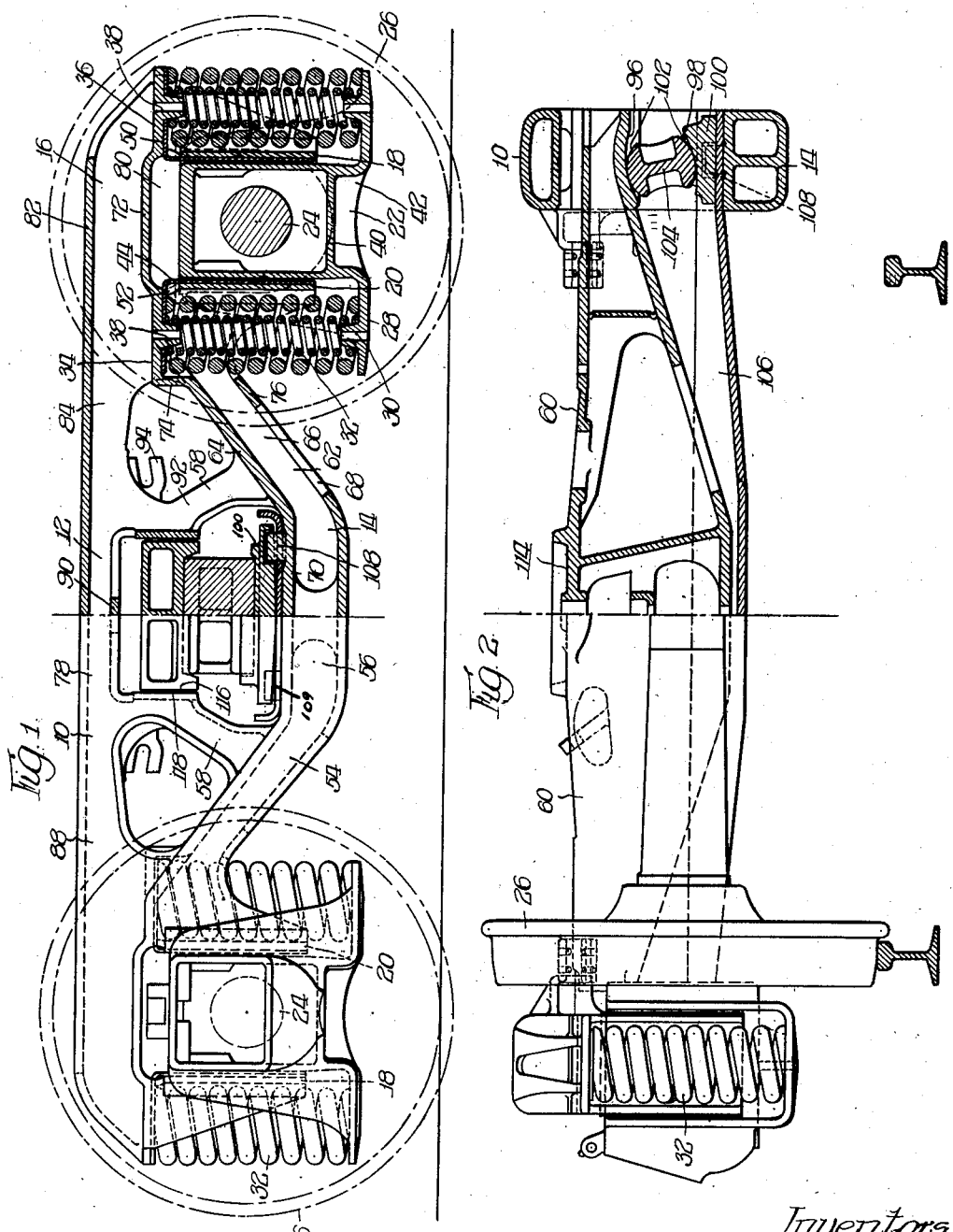

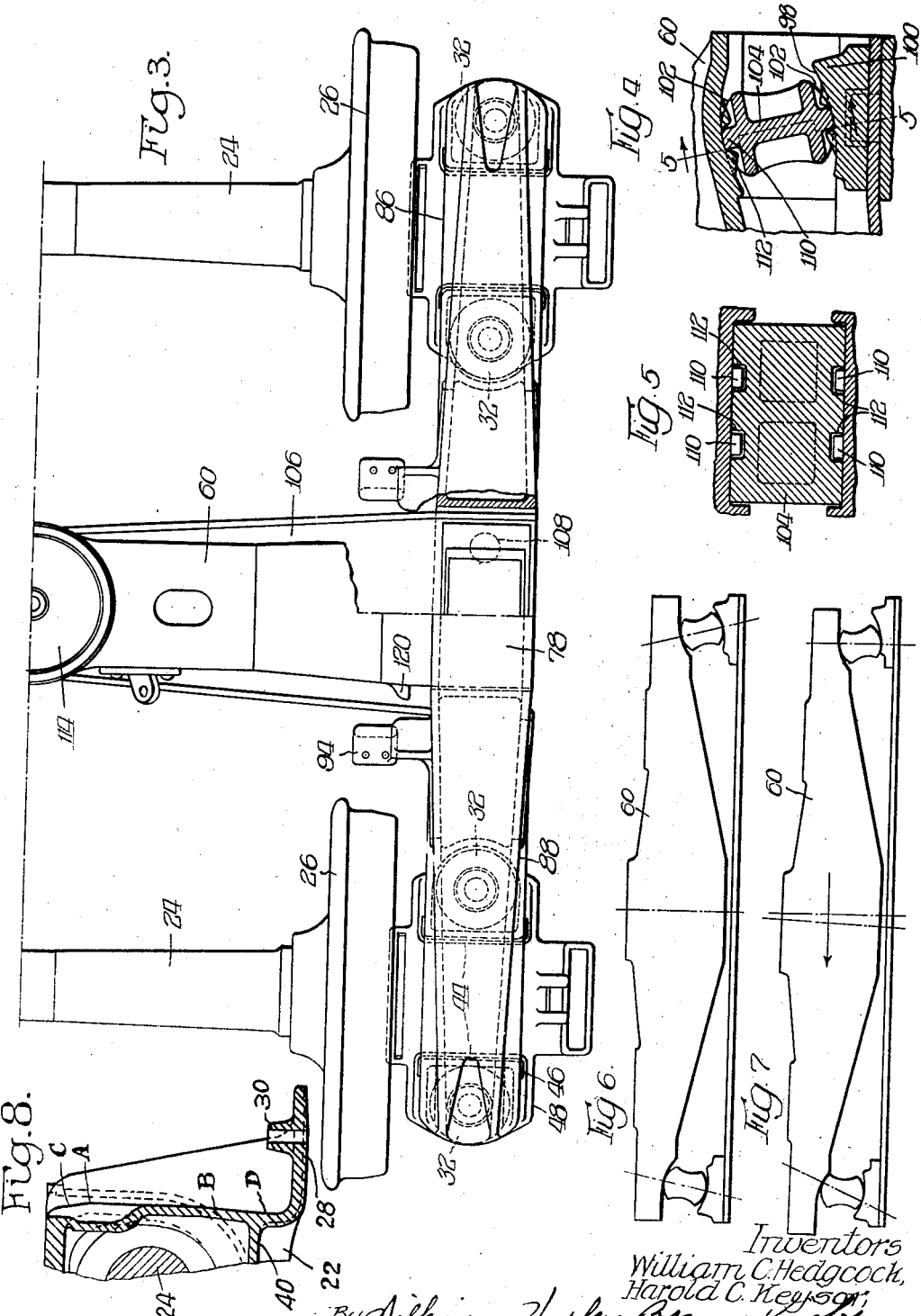

2,063,739

UNITED STATES PATENT OFFICE 2,063,739

TRUCK

William C. Hedgcock, Wilmette, and Harold C. Keysor, La Grange Park, Ill., assignors to American Steel Foundries, Chicago, Ill., a corporation of New Jersey Application July 21, 1931, Serial No. 552,152

27 Claims. (Cl. 105—182)

This invention pertains to car trucks.

An object of this invention is to provide a car truck having easy riding qualities for the protection of the car and lading, and one which is adapted to permit of high speed operation without danger of derailment or damage.

Another object of the invention is to provide a truck which lessens the destructiveness of shocks transmitted to the track, truck parts, or car body.

Still another object of the invention is to provide a truck with a spring arrangement which diminishes harmonic spring oscillations.

Yet another object of the invention is to provide a truck with a comparatively small amount of unsprung weight.

A further object is to provide a truck which fulfills all requirements of manufacture and service, and is of simple and economical construction.

With these and various other objects in view, the invention may consist of certain novel features of construction and operation as will be more fully described and particularly pointed out in the specification, drawings and claims appended hereto.

In the drawings, which illustrate an embodiment of the device and wherein like reference characters are used to designate like parts—

Figure 1 is a side elevation partly in section of a truck embodying the invention;

Figure 2 is an end elevation partly in section of the truck shown in Figure 1;

Figure 3 is a top plan view partly in section of a half of the truck construction shown in Figure 1;

Figure 4 is an enlarged sectional elevation through the bolster and rocker construction;

Figure 5 is a sectional elevation through the rocker construction taken substantially in the plane as indicated by line 5—5 of Figure 4;

Figure 6 is a diagrammatic transverse elevation of the bolster and rocker supporting construction showing the parts in rest or normal position;

Figure 7 is a diagrammatic transverse elevation of the bolster and rocker supporting construction showing the parts after transverse movement of the bolster;

Figure 8 is an enlarged fragmentary sectional elevation of the tapered pedestal cooperating portion of the journal box construction.

In the form of the truck shown the side frame 10 is of integral construction and is provided with the compression member 12 and the tension member 14. The tension and compression members merge adjacent their ends as at 16, said ends being provided with depending spaced pedestals 18 and 20 adapted to embrace journal boxes 22 cooperating with the journals 24 of the wheel and axle assemblies 26. The wheel and axle assemblies, of course, may be of standard A. R. A. construction, or of the simplex construction, or of any other desired type. The journal boxes are fashioned in any desired manner for cooperation therewith. The journal boxes 22 have extending and depending seats 28, one on each side of the box, said seats being provided with the dowels 30 having cooperative engagement with the spring nests 32 disposed between each spring seat 28, and seats 34 and 36 provided on the side frame, said seats being provided with positioning dowels 38 for positioning the spring nests in a similar manner as the dowels 30. The springs 32, although they may be of the usual form, are preferably helical springs formed with a varying pitch, or a plurality of pitches, and thus a plurality of stiffnesses, so that with a given static load their period of oscillation changes within their deflection range. This type of spring is described more in detail in application Serial No. 552,153, filed July 21, 1931.

To obtain the proper advantages of this type of spring, the proportions thereof must be such as to make it considerably greater in height than the usual helical coil springs of the same load and surface. An advantageous position to accomplish this height is alongside the journal boxes, as illustrated in the present application. Ample provision for suitable spring height is afforded by making the spring seats 30 of the journal box on a level below the bottom 40 of the journal box cellar, and at the same time this permits making the side frame pedestals 18 and 20 deep enough to provide ample bearing area and good guiding qualities for the journal box. The rib 42 is provided across the bottom of the journal box between the depending spring seats to serve as a strut or base between the spring seat portions and to reenforce them against bending inwardly under load. The load being transmitted equally by the springs arranged symmetrically on each side of the journal box tends to prevent undesired tilting and binding of the journal boxes in the pedestals; and the load being applied to the journal boxes considerably below the mounting on the axle still further helps in this respect.

To further lessen the chance of binding between the journal box and pedestals the faces of the journal box are made with a flat contact surface provided for guiding against the associated pedestal, but this surface extends vertically for a limited distance A to B in Figure 8 above and below the center of the journal, beyond which points the surfaces taper away as at C and D from the contact line. The normal clearance for vertical sliding between the box and the pedestals will thus permit a certain amount of tilting without binding, and this action is benefited by the shape described, thus permitting a certain small tilting action of the box without impairing its free vertical motion with respect to the side frame.

Should any wear take place as a result of the vertical motion of the journal boxes and the side frame pedestals, it is desired that the side frame be free from such wear on account of the relatively high cost of renewal. The pedestals 18 and 20, therefore, are provided with wearing plates 44 which take the wearing action and are readily replaceable. These wearing plates are applied and held in place without any bolts, rivets, welding, or similar attaching means, thus facilitating application for renewal. Each wearing plate has a bearing surface cooperating with the journal box and is provided with flanges 46 which serve as contact faces for the flanges 48 of the journal box, and also serve to position the wearing plate laterally of the pedestal. The plate has a further portion 50 which extends through the opening 52 in the pedestal face of the side frame and is provided with an aperture embracing the dowel 38. With the journal box removed from the side frame, the wearing plate is applied by putting the foot 50 through the opening 52, tilting the wearing plate until the aperture passes over the dowel, and then slipping the plate into its desired position. The plate is then held in place by the pressure of the springs and the load thereon, the foot 50 serving as an intermediate spring seat for this purpose.

The width across the side frame at the pedestals is made such as to accommodate the springs, which are partially enclosed therein. The width of the side frame tension member 14 is preferably made substantially the same as the pedestal width so as to avoid bends or kinks in the side walls or flanges 54 of this member which carries tension stresses. The portion 56 of the side frame tension member between the spaced columns 58 is preferably a box section for strength in carrying the superimposed load from the bolster 60, since in this respect this member is a beam as well as a tension member. As the tension member continues outwardly and diagonally upward beyond the columns as at 62, it becomes a channel section with the web 64 at the top and with depending flanges 66 having reentrant flanges 68. The web of this channel section is a continuation of the top wall 70 of the section 56 and continues to merge with the inner spring seat 34, and then continues outwardly as at 72 above the journal seat 28, and then continues outwardly above the journal box and to the outer spring seat 36. Thus a continuous tension web is provided between all the load supporting portions. In the innerspring seat 34 a partially circular pocket is formed at 74 to receive and clear the springs, but the principal line of the web 64 continues across the corner of this spring pocket to meet the line of this spring seat at substantially the vertical center line of the spring so that the principal tension forces are carried directly to the center of the spring seat. A tie 76 connects the tension member flanges 66 adjacent the inner spring nest and stiffens the pedestal and tension member against transverse forces.

The side frame compression member 12 has considerable width at its central portion 78 for transverse strength, but this width is preferably narrower beyond the columns 58, and progressively narrower toward and above the pedestals since the transverse moments diminish toward the ends of the side frames. Above the pedestals 18 and 20 and the journal box opening 80, the compression and tension members are united to form a box section for strength and stiffness against bending, since this portion of the side frame is a sort of loaded cantilever extending beyond the truss portion. In this box section the web 82 of the compression member forms the top wall and the spring seats 36, and the web 72 forms the bottom walls with the compression member flanges 84 forming the side walls. Since the spring seats and web 72 are wider than the compression member, this box section has in effect the outwardly projecting flanges 86 at its bottom. As the bottom of this section is in tension under load, the greater width of the bottom web provides a large area to resist the tension stresses. The relative closeness of the two walls stiffens the section and reenforces the spring seats 34 and 36 above the springs. The compression member throughout its intermediate length at 78 and 88 is of channel section, having an upper web and depending flanges 84 with the stiffening tie 90. The flanges 84 merge with the side flanges 92 of the columns 58, and brake hanger brackets 94 are provided for suspension of the brake beams adjacent the wheels.

The characteristics of the transverse motion of the bolster 60 and the resistance offered thereto are determined by the shape and position of arcuate rocking surfaces 96 provided on the bolster adjacent the ends thereof, and the rocking surfaces 98 on the rocker seat 100 and cooperating rocking faces 102 on the rocker 104 in relation each to the others. In the construction shown, the arcuate surfaces 102 on both faces of the rocker 104 are portions of a cylinder having a common center for their radii. The arcuate surfaces 96 and 98 on the bolster 60 and rocker seat 100 are formed with a larger radius or contour equivalent thereto than the radius of the face of the rocker. The rocking surfaces of the bolster and rocker seats are so arranged in relation to each other that lines through the contact points of the contours of these surfaces on both sides of the truck converge upwardly (see Figure 6). This arrangement of the elements of the rocker system permits a resisted transverse motion practically the same as obtained with the familiar inclined swing hanger arrangement used in passenger car trucks, but with a simpler construction wherein fewer parts are required, members are in compression instead of tension, and the possibilities of wear are reduced. The inclination of the rocking surface axes provides the desired resistance to too free lateral motion, but when considerable lateral forces are encountered this resistance is overcome, permitting the lateral motion of the bolster to ease the transmission of forces to other parts of the car and truck. When lateral motion takes place, that end of the bolster toward the direction of motion rises, while the opposite end becomes lower, which has the effect of causing the lateral motion to follow a curved path and to tilt the car body. The operation of this lateral motion arrangement is shown by Figures 6 and 7, Figure 6 showing the parts at rest in normal position.

The upward converging inclination of the axes of the rocking surfaces causes an in-thrust on each rocker against the bolster, which thrusts balance each other in the normal position, and give some resistance to lateral motion. When lateral forces exceed the lateral resistance of the rockers, lateral motion takes place and the position of parts shown in Figure 7 is obtained, in which the arrow indicates the direction of motion. The resistance increases as the motion increases. In any position there is a force tending to spread the lower rocker seats due to the downward divergence of the axes of contact of the rocking surface. This spreading force is resisted, and the rocker seats maintained in proper relation with each other, by the crosstie 106, which serves as a tie between said rocker seats by virtue of the disengageable attachment of the rocker seats to the crosstie through the dowels 108. As mentioned above, the characteristics of the lateral motion are determined by the proportions and relations of the rocking surfaces, and these may be varied somewhat in individual truck designs to obtain lateral motion characteristics most suitable for certain kinds of cars or service. The rockers may be portions of a cylinder, as in the preferred construction, in which case they act as rollers, or they may have their functional surfaces formed by radii whereby they rock rather than roll. For any of these forms, in which their function remains substantially the same, they are referred to herein as rockers for simplicity in common description.

In order to maintain the desired relation of the parts between the rockers 104 and their engaging surfaces 102, the rocker seats 100 and the bolster 60 respectively have interengaging lugs and recesses 110 and 112, as shown in Figures 4 and 5. These lugs and recesses are so shaped as to maintain the parts in proper relation throughout their permitted range of movement, but not to interfere with this motion. As has been described, the side frames are of truss-like construction. The portion 56 between the columns 58 on the tension member forms a seat for the crosstie 106 for carrying the superimposed load and transmitted through the center bearing 114 and the bolster 60. The crosstie seat 70 is provided with upstanding dowels 108 fitting into corresponding apertures in the crosstie 106 serving as a disengageable attachment between the side frames and the crosstie. The dowels 108 extend above the upper face of the crosstie web and fit into apertures in the rocker seats 100 serving as a means for connecting said rocker seats to said crosstie. The rocker seats engage the crosstie through an arcuate surface 109 serving to permit slight rocking of the bolster longitudinally of the truck. The dowels are preferably made a fairly close fit in the crosstie apertures so that the side frame and crosstie are maintained in accurate position with each other, thus maintaining a square truck properly aligned. In this way the crosstie serves to keep the truck square and also to tie the pair of side frames and to resist the outward thrust of the lower ends of the rockers against the rocker seats 100. The bolster is permitted a limited transverse motion with respect to the side frames by the rolling and rocking action of the rockers on which it is maintained. This motion is guided in a transverse plane by the opposing faces 116 and 118 provided on the bolster and on the side frame columns. The extent of transverse movement is limited by the stops 120 on the bolster which contact against the side frame columns when the desired limit of motion is reached.

With the type of truck described the springs being between the journal boxes and side frames leaves only a small necessary part of the truck weight unsprung, which improves riding qualities and diminishes shocks to the track, wheels, axles, journal bearings, and side frame. The use of variable pitch springs diminishes harmonic amplified motion due to vertical track irregularities, and thereby gives steadier riding qualities and prevents amplification of motion or bouncing which might lead to derailment. The use of variable pitch springs gives easier riding qualities to both light and heavy loads. The lateral motion feature diminishes the shock of transverse forces due to curves and track irregularities, and thereby gives easier riding qualities and relieves the truck parts and lading of destructive shocks. The lateral motion feature also provides cross-equalization in the truck due to the curved path followed by the laterally moving bolster, and thereby allows compensation for differences in track level on opposite sides of the truck. When a difference in transverse track level is encountered the bolster may move laterally until the rising of one end thereof and the lowering of the other end compensate for the difference in level, thus tending to equalize the loading of all the wheels and thereby prevent derailment.

It is to be understood that we do not wish to be limited by the exact embodiment of the device shown which is merely by way of illustration and not limitation, as various and other forms of the device will of course be apparent to those skilled in the art without departing from the spirit of the invention or the scope of the claims.

What is claimed is—

1. In a car truck, a side frame having a pedestal and a spring seat, and a pedestal wearing plate engaging the face of said pedestal and said spring seat.

2. In a car truck, the combination of a side frame having a pedestal and a spring seat, a spring for supporting said side frame, and a pedestal wearing plate engaging the face of said pedestal and engaging said spring seat and held in place by the pressure of said spring.

3. In a car truck, the combination of a side frame having a pedestal and a spring seat with a spring positioning dowel, a pedestal wearing plate engaging said pedestal and fitting about said spring positioning dowel, and a spring supporting said side frame and holding said wearing plate against said spring seat.

4. A pedestal wearing plate having a web for engaging a side frame pedestal, and having a flange for engaging a side frame spring seat.

5. A pedestal wearing plate having a web for engaging a side frame pedestal and for guiding an associated journal box, and having a flange for engaging a side frame spring seat, said flange having an aperture to engage positioning means on said spring seat.

6. In a truck side frame, a pedestal having a face and spaced flanges, a spring seat partly enclosed by said pedestal face and flanges, said pedestal face having an opening therethrough adjacent said spring seat, and a wear plate extending into said opening and cooperating with said spring seat whereby the same is positioned.

7. In a truck side frame, a pedestal having a face and spaced flanges, a spring seat partly enclosed by said pedestal face and flanges, a positioning dowel on said spring seat, said pedestal face having an opening therethrough adjacent said spring seat, a wearing plate extending through said opening and having means cooperating with said dowel whereby the same is positioned.

8. In a car truck, the combination with a side frame, of a crosstie member supported on the side frame, a rocker seat supported on said crosstie member, and a dowel on the side frame engaging said crosstie member and loosely engaging said rocker seat for permitting rocking movement thereof.

9. In a car truck, the combination with a side frame having a tension member, of a crosstie member non-resiliently supported on the tension member of said side frame, a rocker seat movably supported on said crosstie member, and means on said side frame mutually interlocking the side frame, crosstie member and rocker seat in lateral relationship.

10. In a car truck, the combination with a side frame, of a crosstie member directly supported on said side frame, and a rocker seat supported on said crosstie member and provided with means permitting it to rock thereon.

11. In a car truck, the combination with a side frame have a tension member, of a crosstie member non-resiliently supported on the tension member of said side frame, and a rocker seat supported on said crosstie member and provided with means cooperating with said tie member permitting it to rock thereon in a plane parallel to the longitudinal axis of the side frame.

12. In a car truck, the combination with a side frame having a tension member, of a crosstie member non-resiliently supported on the tension member of said side frame, a rocker seat supported on said crosstie member and provided with means cooperating with said tie member permitting it to rock thereon, and means interlocking the side frame, crosstie member and rocker seat in lateral relationship.

13. In a car truck, a side frame, a bolster, a rocker seat non-resiliently mounted on said side frame for accommodating a rocker supporting said bolster, said seat having a curved surface for permitting rocking motion of said seat in one direction and having another surface for accommodating said rocker mounted for motion in another direction.

14. In a car truck, a side frame, a bolster, a rocker seat non-resiliently mounted on said side frame for accommodating a rocker supporting said bolster, said seat having a curved surface for permitting rocking motion of said seat in one direction and having another surface for accommodating said rocker mounted for motion in another direction, and means for positioning said rocker on said rocker seat.

15. In a car truck, a side frame, a rocker seat non-resiliently supported by said side frame and having a curved surface for rocking motion of said seat in one direction and having another curved surface for accommodating a rocker having motion in another direction.

16. In a car truck, the combination of a side frame having a tension member, a rocker seat non-resiliently mounted on said tension member for accommodating a rocker for supporting a truck bolster and having a curved surface for rocking motion on the truck structure, and having another surface for a rocker to rock thereon, and means on said tension member for positioning the rocker seat on said side frame.

17. In a car truck, the combination of spaced side frames, a bolster, lateral motion means interposed between said side frames and bolster, said means being non-resiliently mounted on said frames and providing a non-resilient support for said bolster and disposed whereby when lateral movement of said bolster occurs one end thereof will be disposed below the other end, said lateral motion means being provided with means permitting rocking thereof longitudinally of the truck.

18. In a car truck, the combination of a side frame including tension and compression members and spaced columns integrally connecting said tension and compression members and forming a window therewith, a load carrying member extending into said window, a rocker seat non-resiliently supported for rocking movement in said window, and a rocker interposed between said load carrying member and rocker seat for mounting said load carrying member for lateral movement on said rocker seat.

19. In a car truck, the combination of a side frame including tension and compression members and spaced columns integrally connecting said tension and compression members and forming a window therewith, a load carrying member extending into said window, a rocker seat non-resiliently supported for rocking movement longitudinally of said side frame in said window, and a rocker interposed between said load carrying member and rocker seat for mounting said load carrying member for lateral movement on said rocker seat.

20. In a car truck, the combination of spaced side frames, a load carrying member, means interposed between said member and frames and non-resiliently mounted on the latter in the plane thereof to provide for transverse movement of said member relative to said side frames, and means supporting said first-named means and having means cooperating with said frames to provide for rocking of said member longitudinally of the truck.

21. In a car truck, the combination of spaced side frames, a load carrying member, lateral motion means interposed between said member and frames and non-resiliently mounted on the latter in the plane thereof to provide for transverse movement of said member relative to said side frames, said means and side frames cooperating to permit rocking of said member longitudinally of the truck.

22. In a car truck, the combination of a side frame, a load carrying member, a rocker seat non-resiliently supported by said side frame in the plane thereof for rocking movement relative thereto, and a rocker interposed between said load carrying member and rocker seat for mounting said load carrying member for lateral movement on said rocker seat.

23. In a car truck, the combination of spaced side frames, a load carrying member, means interposed between said member and frames and non-resiliently mounted on the latter in the plane thereof to provide for transverse movement of said member relative to said side frames, and means supporting said first means and having means cooperating with said frames to provide for rocking of said member longitudinally of the truck, said side frames and means having cooperating means to prevent displacement of said latter means.

24. In a car truck, the combination of spaced side frames, a load carrying member, lateral motion means interposed between said member and frames and non-resiliently mounted on the latter in the plane thereof to provide for transverse movement of said member relative to said side frames, said means and side frames cooperating to permit rocking of said member longitudinally of the truck, said side frames and lateral motion means having cooperating means to prevent displacement of said latter means.

25. In a car truck, the combination of a side frame, a load carrying member, a rocker seat non-resiliently supported by said side frame in the plane thereof for rocking movement relative thereto, and a rocker interposed between said load carrying member and rocker seat for mounting said load carrying member for lateral movement on said rocker seat, said rocker seat and frame having cooperating means to prevent displacement of said seat.

26. In a truck side frame, a pedestal having a face, a spring seat disposed adjacent said face, said face having an opening adjacent said spring seat, and a wear plate disposed in said opening and engaging said face and spring seat.

27. In a truck side frame, a pedestal having a face, a spring seat disposed adjacent said face, said pedestal face having an opening therethrough adjacent said spring seat, and a wear plate extending into said opening and cooperating with said spring seat whereby the same is positioned.

WILLIAM C. HEDGCOCK.
HAROLD C. KEYSOR.